United States Patent [19]
Gloor et al.

[11] Patent Number: 6,014,749
[45] Date of Patent: Jan. 11, 2000

[54] DATA PROCESSING CIRCUIT WITH SELF-TIMED INSTRUCTION EXECUTION AND POWER REGULATION

[75] Inventors: Daniel Gloor, Gebenstorf; Paul G. M. Gradenwitz, Zürich; Gerhard Stegmann, Wettswil; Daniel Baumann, Zürich, all of Switzerland

[73] Assignee: U.S. Philips Corporation, New York, N.Y.

[21] Appl. No.: 08/968,374

[22] Filed: Nov. 12, 1997

[30] Foreign Application Priority Data

Nov. 15, 1996 [EP] European Pat. Off. .............. 96203205

[51] Int. Cl.$^7$ ...................................................... G06F 1/32
[52] U.S. Cl. ......................... 713/300; 713/320; 713/322; 713/340; 713/600; 710/25; 714/814; 714/815; 326/21; 326/93
[58] Field of Search .................................... 395/553, 559, 395/750.04; 326/93, 21; 375/359; 713/300, 320, 322, 340, 600; 714/814, 815; 710/25

[56] References Cited

U.S. PATENT DOCUMENTS

| | | | |
|---|---|---|---|
| 5,121,488 | 6/1992 | Agnes | 712/229 |
| 5,367,638 | 11/1994 | Niessen | 395/877 |
| 5,373,204 | 12/1994 | Muramatsu et al. | 326/93 |
| 5,475,320 | 12/1995 | Ko | 326/21 |
| 5,542,061 | 7/1996 | Makoto | 712/214 |
| 5,698,996 | 12/1997 | Ko | 326/93 |
| 5,737,614 | 4/1998 | Durham et al. | 395/750.04 |
| 5,752,012 | 5/1998 | Smith | 395/559 |

*Primary Examiner*—Meng-Ai T. An
*Assistant Examiner*—Nabil El-Hady
*Attorney, Agent, or Firm*—Brian J. Wieghaus

[57] ABSTRACT

The data processing circuit has a self-timed instruction execution unit, which operates asynchronously, signalling the completion of processes and starting subsequent processes in response to such signalling. In order to satisfy real time constraints upon program execution ready signals generated after completion of selected instructions are gated with a timer signal before they are used to start a next instruction. In an embodiment, the amount of time left between the ready signal is used to start a next instruction is measured and used to regulate a power supply voltage of the instruction execution unit so that it is just high enough to make the instruction execution unit sufficiently fast to meet the real time constraints.

9 Claims, 1 Drawing Sheet

DATA PROCESSING CIRCUIT WITH SELF-TIMED INSTRUCTION EXECUTION AND POWER REGULATION

BACKGROUND OF THE INVENTION

The invention relates to a data processing circuit.

U.S. Pat. No. 5,367,638 discloses a circuit containing electronic circuitry including self-timed elements. Such electronic circuitry does not require a central clock to initiate operations. Instead, each self-timed element starts operating in response to its own local "request" signal received from a circuit that has to operate before the self-timed element, for example because it produces the data upon which the self-timed element operates. A self-timed element receives a request signal and starts operating only when it is necessary that the self-timed element operates. This is in contrast to centrally clocked circuit elements, which receive clock signals irrespective of whether they need to operate. Thus circuitry with self-timed elements consumes less power than centrally clocked circuit elements.

U.S. Pat. No. 5,367,638 moreover discloses a further reduction in power consumption which is achieved by regulating the supply voltage of the electronic circuitry, and thereby both its power consumption and its operating speed, so that the self timed elements complete operation just in time to cope with the processing load, but no faster.

The circuit of U.S. Pat. No. 5,367,638 has to accept and/or deliver data in real time, as defined by an external clock. In order to satisfy this real-time requirement with self-timed elements, the circuit contains a FIFO buffer which accepts data at the instants in time that the data is produced by the self-timed elements, buffers the data and outputs it at the instants time required according to the external clock. The speed of the circuit is regulated so that the FIFO buffer does not overflow.

The usefulness of this mechanism of realizing real-time performance is limited to the real-time production of data. Other real-time requirements, such as those which occur during execution of a program with instructions of which some (e.g. peripheral control instructions, refreshing access to DRAM) have to be executed with a specified time-delay with respect to each other, or with an specified average time-delay, cannot be satisfied in this way.

Amongst others, it is an object of the invention to provide for a circuit with a self-timed instruction execution unit with which real-time requirements can be satisfied.

SUMMARY OF THE INVENTION

The invention provides for a data processing circuit, comprising
- a self-timed instruction execution unit having an interface for transmitting a ready signal and for receiving a request signal, the instruction execution unit generating the ready signal to indicate readiness to start executing a first instruction, the instruction execution unit starting execution of the first instruction upon receiving the request signal;
- a sequencing unit coupled to the interface, for generating the request signal in response to the ready signal;
- a timer for timing a predetermined time-interval starting with the execution of a second instruction whose execution precedes execution of the first instruction, the timer being coupled to the sequencing unit for disabling transmission of the request signal to the instruction execution unit after the time-interval has elapsed.

Thus, a real-time requirement can be imposed on the time-interval between the execution of the first and second instruction. The timer ensures that the first instruction is not executed until after the predefined time-interval has elapsed after execution of the second instruction. Provided that the instruction execution unit is fast enough, the first instruction will be executed precisely after the predetermined time interval.

The data processing circuit according to the invention has a further embodiment wherein the sequencing unit is arranged to transmit a predetermined first number of further request signals to the instruction execution unit upon receiving corresponding further ready signals, between a start of execution of the second instruction and generating the request signal for starting execution of the first instruction, the data processing unit comprising a counter for counting a second number of instructions that the instruction execution unit starts executing after the second instruction, the counter being coupled to the sequencing unit for activating said disabling when said second number has reached said predetermined first number. In this way the timing of any intermediate instructions is wholly self-timed and can therefore be optimized for such aspect as minimum power consumption.

The data processing circuit according to the invention has a further embodiment wherein said second instruction and said predetermined number are programmable. Thus the data processing circuit can be programmed to satisfy real-time requirements upon selected instructions, leaving the timing of other instructions free for self-timing.

The data processing circuit according to the invention has an embodiment comprising
- means for measuring a delay between transmission of the ready signal and transmission of the request signal for executing said first instruction,
- a voltage regulator, for controlling a supply voltage applied to the instruction execution unit, a speed of execution of instructions depending on the supply voltage, the means for measuring being coupled to a control input of the voltage regulator for regulating the delay towards a predetermined value.

The data processing circuit according to the invention also has an embodiment comprising means for detecting an excess time when the time-interval finishes before transmission of the ready signal,
- a voltage regulator, for controlling a supply voltage applied to the instruction execution unit, a speed of execution of instructions depending on the supply voltage, the means for detecting being coupled to a control input of the voltage regulator for regulating the delay towards a predetermined value.

Thus, power consumption can be reduced to the minimum compatible with a real-time requirement between the first and second instruction. Moreover, regulation can thus take place without altering the time delay between execution of the first and second instruction (when the processing speed is higher than necessary during regulation). In contrast to the prior art, no defined datastream is needed to regulate the power supply and therefore power supply regulation can be applied without knowledge of the application program executed by the data processing circuit.

BRIEF DESCRIPTION OF THE DRAWING

These and other advantageous aspects of the data processing system according to the invention will become apparent from a description hereinbelow using the following figures.

FIG. 1 shows a data processing circuit. This circuit contains a self-timed processing unit 10, a sequencing unit 12 and a timer 14. A "RDY" (processing unit ready) output of the processing unit 10 is connected to an input of the sequencing unit 12. An output of the sequencing unit 12 is connected to an "Execute Request" ("REQ") input of the processing unit. The output of the sequencing unit 12 is also connected to an input of the timer 14. An output of the timer 14 is connected to a further input of the sequencing unit 12.

Only relevant aspects of the processing unit 10 are shown. In practice the processing unit may contain a memory (not shown) for storing a program containing machine instructions, a memory for data (not shown), various I/O connections, an arithmetic unit (not shown) registers (not shown) etcetera. However, these elements may also be absent or be provided externally to the processing unit 10.

In operation, the processing unit 10 will take successive instructions into execution one after the other. The processing unit 10 is able to operate in a self-timed mode (asynchronously). Such a self-timed mode of operating circuits is known per se. In this self-timed mode, upon receiving a "request signal" at the REQ input the processing unit 10 will start executing an instruction in a self-timed fashion, that is, some initial part of the processing unit 10 will do some initial processing of the instruction, and when results of that initial processing are available the initial part will generate an internal REQ signal to subsequent parts of the processing unit 10 that use these results. These subsequent parts will start processing and so on. No central clock is used to synchronize the initial part and the subsequent parts.

When the processing of an instruction has progressed sufficiently far, the processing unit 10 will be able to start executing the next instruction. The processing unit 10 will indicate this with a RDY signal on the RDY output of the processing unit 10. The RDY signal may for example be generated when all parts of the processing unit 10 have generated their own ready signal. Alternatively, the RDY signal of the processing unit 10 may be generated when at least those parts of the processing unit that would be disturbed by the start of execution of a next instruction have generated their own RDY signal; this allows pipelined processing. For the purpose of the invention, the "RDY"/"REQ" handshake of any part of instruction execution may be used, as long as that part occurs in each instruction. The point in time when the processing unit generates its RDY signal is thus determined by the speed of the circuits in the processing unit and the kind of instruction. In the self-timed processing unit 10 this point in time is not defined by a central clock.

The sequencing unit 12 generates the REQ signal for the processing unit 10. This REQ signal is also fed to the timer 14, to start a time interval. The sequencing unit 12 has inputs coupled to the RDY output of the processing unit 10 and the output of the timer. The sequencing unit 12 converts the RDY signal received from the RDY output of the processing unit 10 into a new REQ signal for the processing unit, but only after the timer 14 has indicated that the time interval has elapsed. In principle, the sequencing unit can be implemented as an AND gate, AND-ing the request signal and a signal that indicates that the time interval has elapsed.

Figure 1:
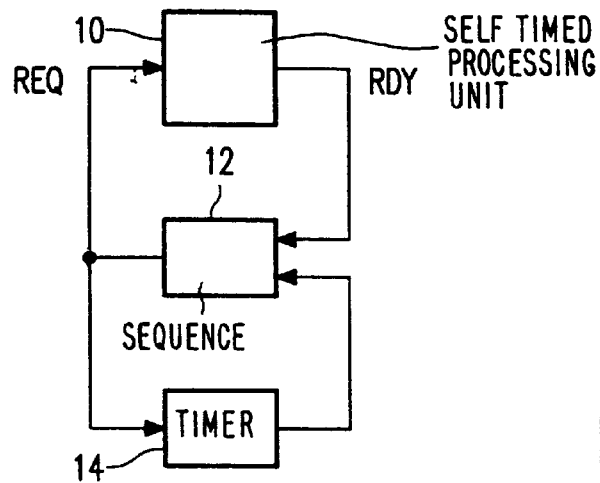
FIG. 1 an embodiment of a data processing circuit according to the invention
Figure 2:
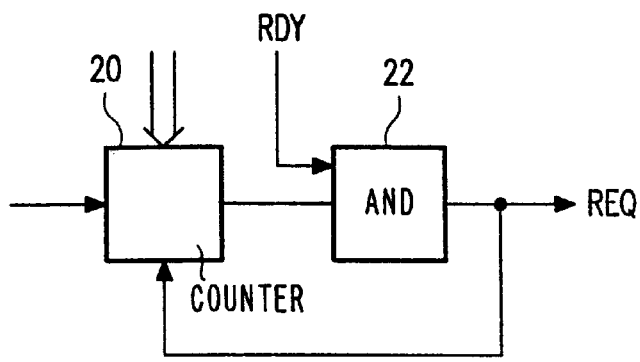
FIG. 2 a sequencing unit for a data processing unit

FIG. 2 shows a sequencing unit for use in a data processing circuit according to the invention. The sequencing unit contains a counter 20 and an AND gate 22. The counter 20 has an input for a preload value, an input for a load signal and a count input. The counter 20 has a count output coupled to an input of the AND gate 22. In the data processing circuit, the RDY output of the processing unit 10 is coupled to a further input of the AND gate 22. The output of the AND gate 22 is coupled to the REQ input of the processing unit 10. The output of the AND gate 22 is also coupled to the count input of the counter 20. The timer 14 is coupled to the input for a load signal of the counter 20.

In operation, a preload value is supplied to the input for a preload value of the counter 20. This preload value is selected, for example, under control of an instruction executed by the processing unit 10. The preload value may also be set externally or fixed during manufacturing, as required by the specifications of the apparatus in which the data processing circuit is used. The preload value is loaded into the counter. When the counter 20 contains the preload value, its count output is logic high and the AND gate 22 passes any RDY signal to the REQ input of the processing unit 10. Each time a RDY signal is passed, this signal is also supplied to the count input of the counter 20, which causes an update of the count value in the counter 20.

When a number of updates has occurred the counter 20 reaches a count value such that the output of the counter 20 becomes logic low. As a result the AND gate 22 will block the passing of further RDY signals to the REQ input of the processing unit 10. The required number of updates before passing is blocked depends on the preload value. After some time, the timer 14 will signal the end of the time interval. This causes the preload value to be loaded into the counter 20, which in turn allows the AND-gate 22 to pass RDY signals to the REQ input of the processing unit 10. Thus the sequencing unit ensures that the processing unit 10 starts executing no more than a predetermined number of instructions during the time interval.

Figure 3:
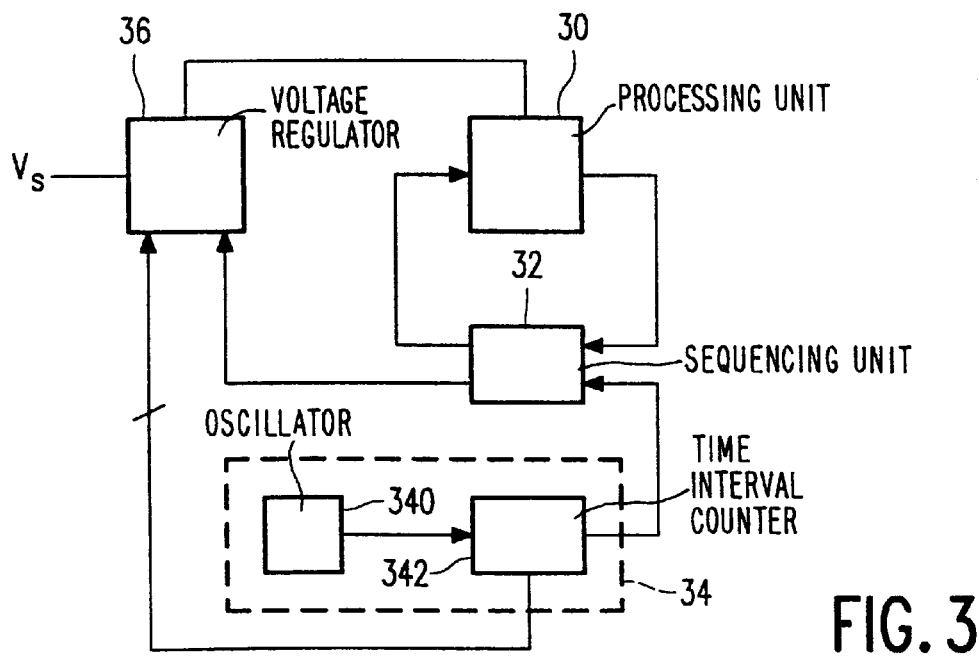
FIG. 3 a further embodiment of a data processing circuit according to the invention.

FIG. 3 shows a further data processing circuit according to the invention. This circuit contains the processing unit 30, the sequencing unit 32 and the timer 34. The timer 34 contains a clock oscillator 340 and a time interval counter 342, the clock circuit 340 being coupled to a count input of the time interval counter 342, a count output of the time interval counter 342 being the output of the timer. The count output of the time interval counter 342 is also coupled to a preload input of the time interval counter 342.

Furthermore, the data processing circuit contains a supply voltage regulator 36, having a regulated supply voltage output coupled to a supply voltage input of the processing unit 30. The sequencing unit 32 has a "wait" output coupled to a first input of the supply voltage regulator 36. A count value output of the time interval counter 342 in the timer 34 is coupled to a second input of the supply voltage regulator.

In operation the time interval counter 342 in the timer 34 serves to set the time interval to a multiple of the period of the clock oscillator 340. The count output of the time interval counter 342 produces an output signal when the count value in the time interval counter 342 reaches a predetermined value (for example zero). This output signal of the time interval counter 342 is used by the sequencing unit 32 to allow passing the RDY signal from the processing unit 30 to the REQ input. This output signal of the time interval counter 342 also causes the time interval counter 342 to load a new count value. The new count value is preferably set by an instruction executed by the processing unit 30, so that the time interval may be set during instruction execution, dependent on the needs of the program being executed. The new count value may also be set externally or fixed during manufacturing, as required by the specifications of the apparatus in which the data processing circuit is used. Strictly speaking the new count value should be loaded when the "REQ" signal is generated in response to the output signal of the time interval counter 342, for example by using the logic "and" of the "REQ" signal and the output signal as a preload signal for the counter. However, in practice it makes little difference that only the output signal is used, because the "REQ" signal usually immediately follows the output signal of the timer 34.

When the sequencing unit 32 is prepared to generate a REQ signal to the processing unit 30, except that the sequencing unit 32 is waiting for the signal from the timer 34, the sequencing unit generates a "WAIT" signal at its wait output (in the sequencing unit of FIG. 2 this signal could for example be derived from the output of the counter 20 in the sequencing unit). Upon this signal the supply voltage regulator 36 samples the count value of the time interval counter 342. The sampled value is used to control the supply voltage of the processing unit 30 (for example using a DC—DC converter or by modulating a pulse width of current supplied to a supply voltage capacitor (not shown)). One may also generate a "delay" signal when the processing unit generates the "REQ" signal only after the output of the timer 34 has signalled to the sequencing unit 32 that "REQ" may be passed. This delay signal may be used additionally to control the supply voltage when the "REQ" signal is generated after said signalling.

A change in supply voltage will result in a change in speed of instruction execution by the processing unit 30. Generally, the processing unit 30 will become slower as the supply voltage is reduced. As a consequence, the processing unit 30 will generate a "RDY" signal with more delay after a corresponding "REQ" signal. This in turn will affect the amount left in the count value of the time interval counter 342 when it is sampled.

The supply voltage regulator 36 will use the change in supply voltage of the processing unit 30 to regulate this amount left towards a set value, for example by feedback regulation.

Thus the supply voltage of the processing unit 30 is adapted to the minimum required to attain a predetermined speed. As the power consumed by the processing unit is generally proportional to the square of its supply voltage, this will result in a considerable power saving. During regulation, the average number of instructions executed per unit time will not change, even when the power supply voltage changes, because the sequencing unit 32 ensures that a predetermined number of instructions is executed in the time interval.

We claim:

1. A data processing circuit, comprising
   a self-timed instruction execution unit having an interface for transmitting a first ready signal and for receiving a first request signal, the instruction execution unit generating the first ready signal to indicate readiness to start executing a first instruction of a plurality of instructions, which plurality of instructions have varying execution times, the instruction execution unit starting execution of the first instruction upon receiving the first request signal;
   a sequencing unit coupled to the interface, for generating the first request signal in response to the first ready signal;
   a timer for timing a predetermined time-interval starting with the execution of a second instruction whose execution precedes execution of the first instruction, the timer being coupled to the sequencing unit for disabling transmission of the first request signal to the instruction execution unit until after the time-interval has elapsed.

2. A data processing circuit according to claim 1, wherein the sequencing unit generates a predetermined first number of further request signals to the instruction execution unit upon receiving corresponding further ready signals, the further ready signals being generated by the execution unit upon completion of intermediate instructions executed between a start of execution of the second instruction and generating the request signal for starting execution of the first instruction, the sequencing unit comprising a counter for counting a second number of ready signals for completed intermediate instructions that the instruction execution unit starts executing after the second instruction, the counter being coupled to the sequencing unit for disabling said transmission of the first request signal when said second number has reached said predetermined first number.

3. A data processing circuit according to claim 2, wherein said second instruction and said predetermined first number are programmable.

4. A data processing circuit according to claim 1, comprising
   a measuring circuit which measures a delay between transmission of the first ready signal and transmission of the first request signal for executing said first instruction,
   a voltage regulator which controls a supply voltage applied to the instruction execution unit, a speed of execution of instructions depending on the supply voltage, said measuring circuit being coupled to a control input of the voltage regulator for regulating the delay towards a predetermined value.

5. A data processing circuit according to claim 1, comprising
   a detection circuit which detects an excess time when the time-interval finishes before transmission of the ready signal,
   a voltage regulator, for controlling a supply voltage applied to the instruction execution unit, a speed of execution of instructions depending on the supply voltage, the means for detecting being coupled to a control input of the voltage regulator for regulating away the excess time.

6. A data processing circuit according to claim 4, comprising means for detecting an excess time when the time interval finishes before transmission of the ready signal, the voltage regulator regulating the delay towards the predetermined value under control of the delay when the delay is greater than zero and under control of the excess time when the excess time is greater than zero.

7. A data processing circuit according to claim 2, comprising
   a measuring circuit which measures a delay between transmission of the first ready signal and transmission of the first request signal for executing said first instruction,
   a voltage regulator which controls a supply voltage applied to the instruction execution unit, a speed of execution of instructions depending on the supply voltage, said measuring circuit being coupled to a control input of the voltage regulator for regulating the delay towards a predetermined value.

8. A data processing circuit according to claim 2, comprising a detection circuit which detects an excess time when the time-interval finishes before transmission of the ready signal, a voltage regulator, for controlling a supply voltage applied to the instruction execution unit, a speed of execution of instructions depending on the supply voltage, the detection circuit being coupled to a control input of the voltage regulator for regulating away the excess time.

9. A data processing circuit, comprising a self timed instruction execution unit having an interface for transmitting a ready signal and for receiving a request signal, the instruction execution unit generating the ready signal to indicate readiness to start executing a first instruction, the instruction execution unit starting execution of the first instruction upon receiving the request signal;

a sequencing unit coupled to the interface, for generating the request signal in response to the ready signal, said sequencing unit generates a predetermined first number of further request signals and transmits said further request signals to the instruction execution unit upon receiving corresponding further ready signals to execute a corresponding predetermined number of intermediate instructions between a start of execution of the second instruction, whose execution precedes execution of the first instruction, and generating the request signal for starting execution of the first instruction;

a timer for timing a predetermined time-interval starting with the execution of a second instruction and generating the request signal for starting execution of the first instruction, the timer being coupled to the sequencing unit for disabling transmission of the request signal to the instruction execution unit for starting execution of the first instruction until after the time-interval has elapsed;

a counter coupled to the sequencing unit for counting a second number of intermediate instructions that the instruction execution unit starts executing after the second instruction, wherein the counter disables said transmission of said further request signals to the execution unit to execute said intermediate instructions when said second number has reached the predetermined first number.

* * * * *